Nov. 16, 1926.
K. BERGMANN
FILM PACK
Filed Jan. 25, 1923  2 Sheets-Sheet 1
1,607,044
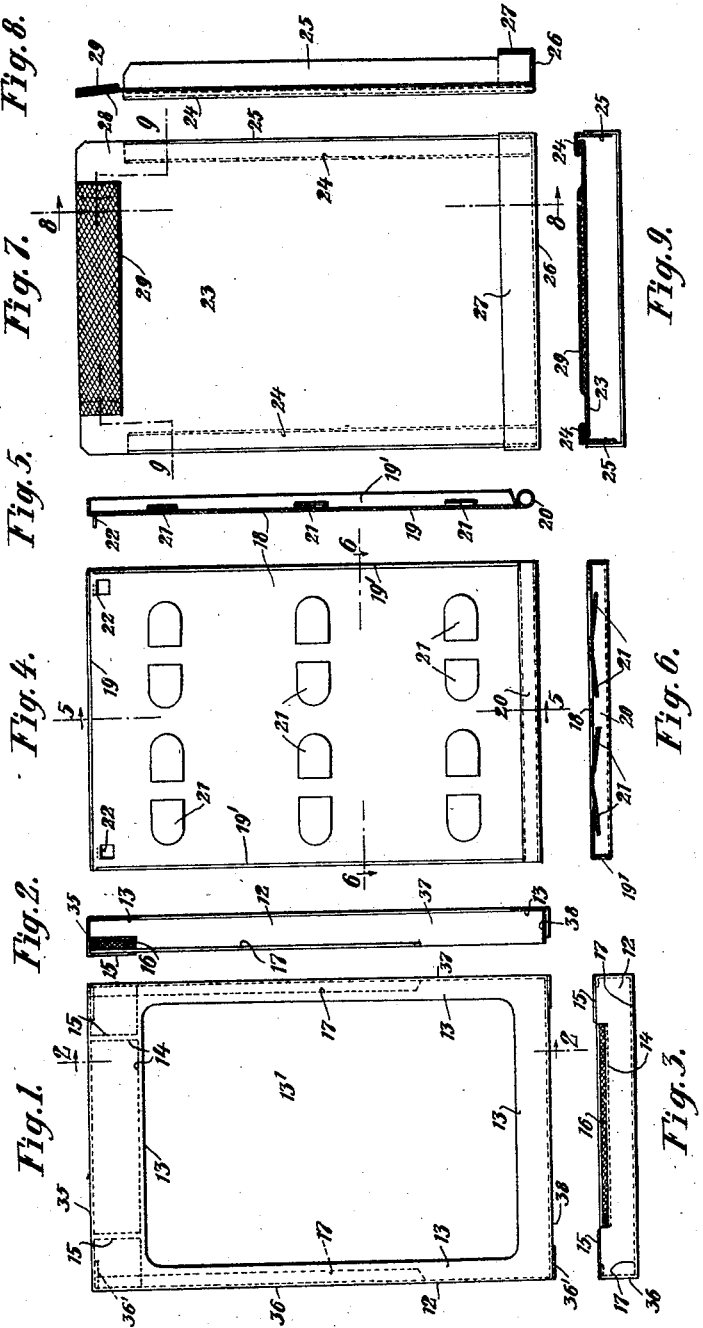

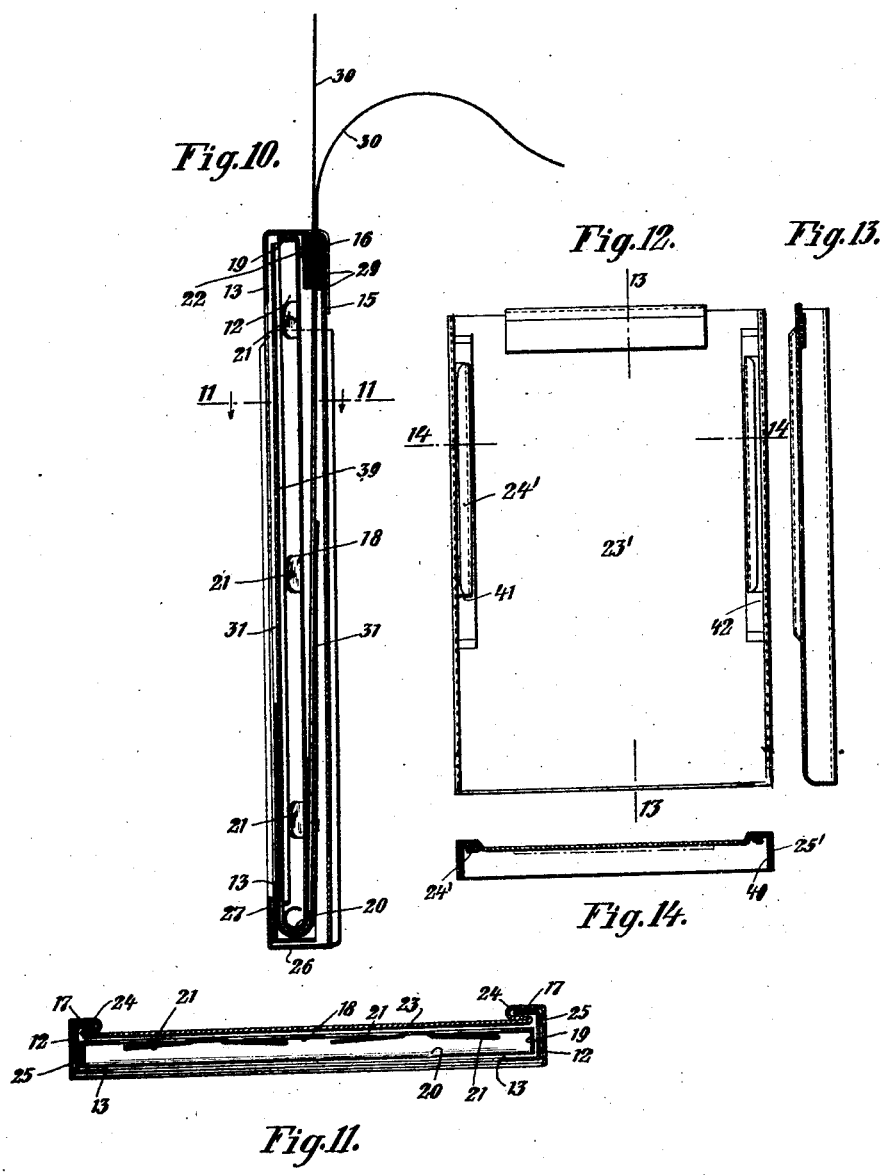

Patented Nov. 16, 1926.

1,607,044

UNITED STATES PATENT OFFICE.

KARL BERGMANN, OF WERNIGERODE, GERMANY.

FILM PACK.

Application filed January 25, 1923, Serial No. 614,942, and in Germany January 26, 1922.

My invention relates to improvements in film packs, and the object of the improvements is to provide a film pack in which the casing enclosing the films is not destroyed when using the films, so that the said casing can be refilled. With this object in view my invention consists in constructing the casing enclosing the films from a front part formed with an exposure opening and a removable rear part or cover forming with the front part a slot for the passage of the operating ends or tabs of the film backing sheets therethrough and constructed so as to exclude light from the interior of the casing.

In order that my invention be more clearly understood several examples embodying the same have been shown in the accompanying drawings in which, Fig. 1, is an elevation showing the front part of the casing provided with an exposure opening, Fig. 2, is a cross-section taken on the line 2—2 of Fig. 1, Fig. 3, is a plan view of Fig. 1, Fig. 4, is an elevation showing the film tray, Fig. 5, is a longitudinal section taken on the line 5—5 of Fig. 4, Fig. 6, is a section taken on the line 6—6 of Fig. 4, Fig. 7, is an elevation showing the cover or rear part of the casing, Fig. 8, is a longitudinal section taken on the line 8—8 of Fig. 7, Fig. 9, is a section taken on the line 9—9 of Fig. 7, Fig. 10, is a vertical section showing the parts of the casing assembled and a film pack enclosed therein, Fig. 11, is a horizontal section taken on the line 11—11 of Fig. 10, Fig. 12, is an elevation showing a modification of the rear part or cover, Fig. 13, is a longitudinal section taken on the line 13—13 of Fig. 12, and Fig. 14, is a cross-section taken on the line 14—14 of Fig. 12.

In the example shown in Figs. 1 to 11, my improved film casing comprises a front part 12, a rear part or cover 23, and a tray 18, which parts are each made from a single piece of sheet metal. The front part 12 consists of a rectangular plate 13 having a rectangular exposure opening 13' made therein and adapted to support the film pack. At the margins the plate 13 is bent rearwardly into side walls 35, 36, 37, and 38 running all around the frame. The upper narrow side wall 35 is bent inwardly at a right angle so as to provide a flange 14, 15 parallel to the plate 13, the median portion 14 of the flange receding relatively to the marginal portions 15, and having a strip of light excluding material 16 glued thereto. The longitudinal side walls 36 and 37 are bent inwardly at right angles and along a part of their lengths to provide narrow flanges or guide members 17 parallel to the plate 13. At the corners the side walls 36 and 37 are provided with corner flaps 36' bent over the side walls 35 and 38 and providing light excluding corner joints.

The film tray 18 consists of a rectangular plate having the upper narrow margin 19 and the longitudinal margins 19' bent forwardly so as to provide a flat casing adapted to have the films embedded therein. The lower margin is rolled into a rounded portion 20 providing a guide for the films being pulled over the same. From the plate 18 spring tongues 21 are struck out and bent forwardly and into the casing, which tongues are adapted to press the follower part 39 and the film pack forwardly and towards the opening 13, and at the upper corners tongues 22 are bent outwardly for clamping the tray in position between the front part 12 and its cover 23.

The rear part or cover 23 consists of a rectangular plate of sheet metal having its longitudinal margins bent rearwardly and inwardly to provide U-shaped guides or pockets 24 and formed into side walls 25. The lower narrow margin is bent forwardly into a side wall 26 and a flange 27 to provide a pocket. The upper narrow margin projecting beyond the side walls 25 and the guide ways 24 is in the form of a tongue 28 covered with a strip 29 of light excluding material such as velvet.

The parts are assembled into a film pack in the manner shown in Figs. 10 and 11. At first the follower part 39 and the film pack are placed into the tray 18 with the paper tabs 30 bent around the rolled margin 20 and the sensitized surface directed outwardly, and the tray is inserted into the front part 13 from the bottom end thereof and below the flanges 17 and with the films located at the side of the exposure opening 13', until the part 18 is covered at its longitudinal margins by the flanges 17. Now the outer film is supported with its margins on the plate 13 and it is pressed in contact therewith by the tongues 22 bearing on the flange portions 15. The paper tabs 30 are placed on the strip of velvet 16 provided on the flange 14. Finally the cover 23 is pushed into the member 13, the side walls 25 enclosing the side walls 12, and the flanges 17 of the frame 13 engaging in the guides or pockets 24 of the cover 23. The tongue 28 is passed below the flange portions 15 and between the same and the tongues 22 of the tray 18, and the velvet strip 29 clamps the paper tabs 30 on the velvet strip 16, said strip excluding the light from the inner parts of the casing. At the bottom end the pocket 26, 27 encloses the bottom part of the front member 13 and excludes the light from the bottom part of the film pack.

For removing the exposed films from the casing the cover 23 and the tray 18 are removed in the reverse order. It will be understood that thereby none of the parts of the casing are injured, so that the same casing can be refilled and used again.

In the modification shown in Figs. 12 to 14 the construction of the front part formed with the exposure opening and the tray may be and preferably is substantially the same as that described with reference to Figs. 1 to 11. However, in the rear part or cover the lateral guide members 24 are constructed in a different way. As shown in Figs. 12 to 14, the portions of the sheet metal from which the side walls 25' are formed are bent inwardly and towards the body of the cover 23' at 40, and the portions 40 are formed with flaps 41 extending from a part away from the upper margin of the body 23' to a part away from the lower margin and bent into a U-shaped guide or pocket 24' disposed in a depressed portion 42 extending from a part away from the upper margin of the body 23' to a part away from the lower margin of the said body.

The parts are assembled substantially in the same way as has been described with reference to Figs. 1 to 11.

In some of the claims I describe the front part 12 and the rear part 23 as being "loosely" connected with each other in order to indicate that the said parts are capable of being disconnected from each other without breaking any rigid or permanent joint and of being connected with each other by being merely put together without making a fixed joint. This feature is important because it permits the casing to be refilled and used over and over again after the films of one pack have been exposed and removed for being developed.

While in describing the invention reference has been made to particular examples embodying the same I wish it to be understood that my invention is not limited to the constructions shown in the drawings, and that various changes may be made in the general arrangement of the apparatus and the construction of its parts without departing from the invention.

I claim:

1. A casing for photographic film packs, comprising two parts of sheet metal in light excluding engagement with each other and one having an opening for the exposure of the films, one of said parts being provided at opposite sides with elongated guide pockets claw-like in section and the other part having flanges corresponding to said pockets and adapted for sliding engagement therewith, and a partition within said casing dividing the same into communicating chambers for unexposed and exposed films, said casing having a passage at one end for the operation of the films therethrough.

2. A casing for photographic film packs, comprising two parts of sheet metal each having a rectangular plate and side walls in light excluding engagement with each other and one having an opening in its plate for the exposure of the films, said casing having a passage at one end for the operation of the films therethrough, a pair of opposite side walls of one part being bent inwardly and towards its rectangular plate into the form of guide pockets and the corresponding side walls of the other part being bent into the form of slides corresponding to said guide pockets, and a partition within said casing dividing the same into communicating chambers for unexposed and exposed films.

3. In a casing for film packs, the combination, with a front part having a rectangular plate formed with an exposure opening, side walls running all around said rectangular plate, inwardly projecting flanges provided at a pair of opposite side walls, and a flange projecting from a third side wall inwardly and covered with light excluding material, of a cover for said front part having a closed rectangular plate, side walls at three of its sides, guide pockets provided at a pair of opposite margins of the rectangular plate of said cover, and cooperating with the flanges of said front part and covered with light excluding material at its fourth side in position for providing a light excluding passage with the light excluding material applied to said flange of the front part, and film holding means within said front part and cover.

In testimony whereof I hereunto affix my signature.

KARL BERGMANN.